Sept. 28, 1965 D. D'AGOSTINO 3,209,239

VOLTAGE STABILIZING EQUIPMENT FOR USE WITH A FLUCTUATING A.C. VOLTAGE

Filed May 24, 1961 2 Sheets-Sheet 1

INVENTOR.
Domenico D'Agostino
BY Michael S. Striker
Attorney

INVENTOR.
Domenico D'Agostino
BY Michael S. Striker
Attorney

United States Patent Office 3,209,239

Patented Sept. 28, 1965

3,209,239

VOLTAGE STABILIZING EQUIPMENT FOR USE WITH A FLUCTUATING A.C. VOLTAGE

Domenico D'Agostino, Via Aselli 30, Milan, Italy

Filed May 24, 1961, Ser. No. 112,462
Claims priority, application Italy, June 3, 1960, 9,864/60
3 Claims. (Cl. 323—45)

The present invention concerns a voltage stabilizing equipment for use with a fluctuating A.C. voltage for maintaining an A.C. output voltage stabilized within very narrow tolerance limits.

According to one feature of the invention this equipment comprises a linear inductance in series with a tank circuit comprising a variable inductance and a capacitor connected in parallel, the input voltage being applied to a point somewhere along the linear inductance and the free end of the variable inductance-capacitor circuit, the output voltage being taken off from the free end of said linear inductance and the free end of said variable inductance-capacitor tank circuit.

According to another feature of the invention the equipment comprises a linear inductance in series with a tank circuit comprising a variable inductance and a capacitor connected in parallel, the input voltage being applied at the free end of said linear inductance and to the free end of said variable inductance-capacitor tank circuit.

The invention will be described further, by way of example, with reference to the accompanying drawings in which.

Figure 1:
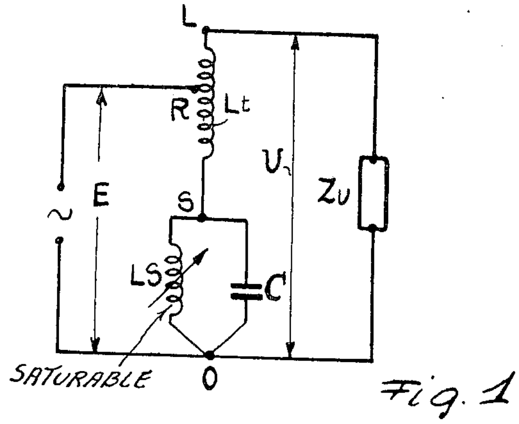
FIG. 1 is a schematic diagram of a preferred embodiment of the invention.

The equipment's electric circuit is shown in general principle in FIG. 1, a linear air gapped inductance $Lt$ which acts as an autotransformer is connected in series with a tank circuit comprising capacitor C and variable inductance $Ls$, the parts $Ls$ and C being connected up in parallel to each other as clearly shown in the diagram. E represents the A.C. input voltage and U represents the corresponding output voltage across which any kind of load $Zu$ is connected.

The input voltage is connected to terminal O and terminal R. The common junction of the two inductances and the capacitor is designated as S, and the output is derived across terminals O and L.

Circuits are known for generating a D.C. signal in response to variation of an A.C. voltage from a desired value. One of these circuits is used to control the variable inductance $Ls$ by partially saturating the core thereof. In order not to impair the clarity of the circuit diagrams, the cores of the inductances have been omitted in the drawings.

The equipment operates as follows: depending on the degree of saturation of inductance $Ls$, its impedance may be greater than or less than the impedance of capacitor C.

Therefore, the tank circuit L depending on the degree of saturation of variable inductance $Ls$ for any given frequency can act either as an inductance or as a capacitance. When input voltage E is relatively low and for this reason it becomes necessary to increase the voltage, then the inductance $Ls$ is partially saturated by means to be described, the current inside the C–$Ls$ circuit is inductive and causes a drop in voltage in inductance $Lt$ and thus a drop in the voltage at point S in respect to that at terminal R of the supply line.

Since inductance $Lt$ also acts as an autotransformer, the drop in voltage at point S causes an increase in voltage at point L in respect to the voltage at terminal R of the line and thus voltage U will be higher than that at the input and may thus be made equal to its nominal value by a suitable degree of saturation of inductance $Ls$. Vice versa, if the line voltage goes too high, then inductance $Ls$ is caused to become desaturated and draws practically no current; the current in the C–$Ls$ circuit proves to be practically the same as that in capacitor C, that is, leading, and thus brings about a negative voltage drop at point S, the voltage at which point increases in respect to that of terminal R of the line. For the same reason as previously explained, the voltage at point L drops in respect to that at terminal R of the line and thus voltage U at the output may again be made equal to its nominal value.

Figure 2:
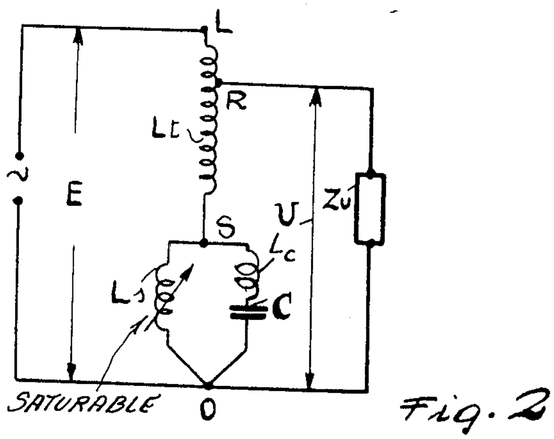
FIG. 2 is a variant of the embodiment shown in FIG. 1.
Figure 3:
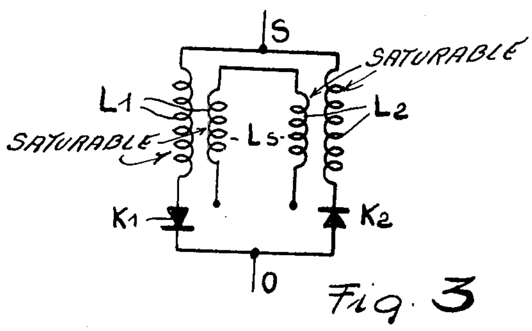
FIG. 3 is a schematic diagram of a form of variable inductance used in the invention.
Figures 5, 6:
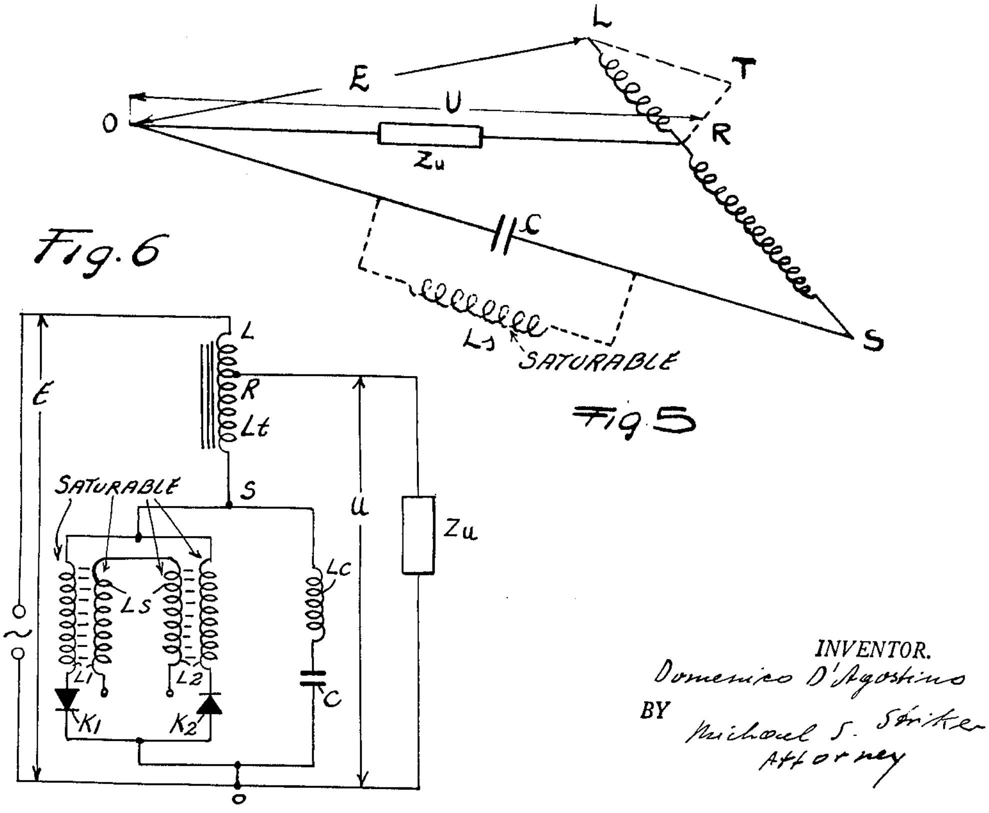
FIG. 5 is a vector diagram for a circuit of the type shown in FIG. 2 when input voltage is minimum, load is maximum and with the maximum allowable misphasing.
FIG. 6 is a schematic diagram of a circuit including embodiments of FIGURES 2 and 3.

Reference is now made to FIG. 3, which shows a modification of a variable inductance $Ls$ that may be used in the system according to FIG. 2. FIGURE 6 shows the details of FIGURE 3 combined with FIGURE 2, in order to clarify the means for effecting the combination circuit according to the claims. Variable inductance $Ls$ is, in effect, composed of two-coil reactances L1 and L2 of the type which is self-saturating by means of rectifiers K1 and K2 and which are connected to each other in parallel and in opposition as shown in the schematic diagram, suitably for the flow of alternating current. The variation in the inductance is provided by varying a control direct current which may flow in either direction through the inner windings of L1 and L2, that is, it may flow in such a way as to contribute to the saturation of $Ls$, i.e. the direction of this flow would operate like that of the main current flowing through rectifiers K1 and K2 and the outer windings of L1 and L2, but it can also flow in the opposite direction to desaturate the two cores and leave them in an unactuated state.

The D.C. control current mentioned above may be supplied by a conventional circuit (not shown) provided for the purpose and deriving from the output voltage U a signal circuit sensitive to very small variations of this output voltage U.

Reference is now made to FIG. 1 and it will be noted that linear inductance $Lt$ has a portion of its length R–L which is arranged so that the load current will flow through it and supply suitable voltage changes in such a way that the voltage U applied to load $Zu$ will be stabilized; the other portion of its length R–S has a greater number of turns over the portion R–L and is arranged so that the current passed by circuit C–$Ls$ will flow through it, said current being the one which is required to produce the proper alternating stabilizing magnetomotive force.

It will be evident that, given the considerable difference between the number of turns over portions R–S and R–L, the current called for by circuit C–$Ls$ is always less than the maximum load current i.e., the current passing through R–L.

It is necessary to supply to inductance $Lt$ magnetomotive force having a wave-form as near as possible to sinusoidal. The composition of inductance LS has already been described above. Capacitor C will preferably have a small inductance in series with it (not shown in the diagram) and consisting of a filter for the third harmonic of the fundamental frequency; that is, the capacitor and the small inductance make up a capacitive load at the fundamental frequency and a short circuit for the third harmonic of the fundamental frequency.

Still for the purpose of improving the filtering effect, the capacitor may be subdivided among a number of condensers, each having an inductance in series with it tuned to a frequency multiple of the fundamental frequency. The capacitor may be connected in parallel to the whole of the variable inductance L*s* or only to part thereof.

An essential characteristic of the circuit in FIG. 1 consists in the fact that when circuit C–L*s* is called upon to provide maximum capacitive current, specifically, under no-load and maximum input voltage conditions, the capacitor finds itself subjected to its maximum voltage. When, instead, the C–L*s* circuit is called upon to put out its maximum inductive current, then the voltage to which the capacitor is subjected is at a minimum. In the latter case, variable inductance L*s* must provide an inductive current equal to the sum of the currents actually required by the linear inductance L*t* (which is constructed with an air gap) and the capacitive current of the capacitor; since the latter current is minimum the maximum current required by the variable inductance will be relatively small.

Reference is now made to FIG. 2 in which, in relation to FIG. 1, the input terminals and load terminals have been exchanged as to their positions in respect to linear inductance L*t* and thus R is connected up to the load and L is connected up to the supply line. In this case circuits C–L*s* requires a maximum of capacitive current when the load is maximum and the input voltage is minimum and under these conditions the capacitor is subjected to its maximum voltage. When there is no load and the input voltage is maximum, then the C–L*s* circuit will require the maximum inductive current and in this case capacitor C will be subjected to its minimum voltage.

It will therefore be apparent that among the various possible forms of embodiment of this invention, the latter described, namely, the embodiment shown in FIG. 2, will be one of the preferred forms of its embodiment, since it is the most economical from the point of view of the design and size of capacitor C, since its capacity will be subjected to maximum voltage at the instant when the circuit requires a heavy capacitive current, in this way making it possible to connect up relatively small capacitance in the circuit.

It should be further noted that according to this form of embodiment, the stabilizer circuit works under less favorable operating conditions (that is, with combined minimum input voltage and maximum load, with maximum phase lag) achieving a rephasing of the total load current drawn, this being an essential advantage both as to contractual agreements with the electric supply company and because it places the supply line in the most favorable condition to furnish current, in that it causes a minimum voltage drop in the line, with further advantage to the operation of the stabilizer subject of this invention.

Obviously, capacitor C need not be connected up in parallel with the entire saturable inductance L*s*, but may also be connected up in parallel with a portion of same.

The operation of the voltage stabilizing equipment which is the subject of this invention may be better understood from the following detailed description of the limiting conditions of its operation made in reference to a circuit of the type shown in FIG. 2; the two limiting conditions are evidently those of maximum input voltage E, combined with a no-load condition and a minimum input voltage E combined with a maximum load, with maximum permissible phase lag.

Figure 4:
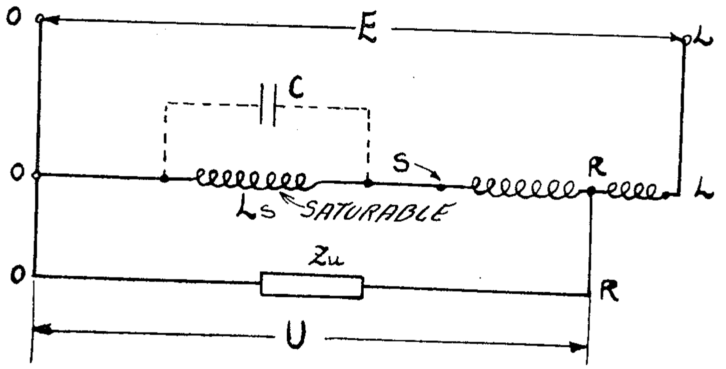
FIG. 4 is the diagram of FIG. 2 rearranged to show the various electrical components in phase and in the positions of their respective voltage drop vectors, and so represents the vector diagram for the circuit of FIG. 2 when maximum input voltage is combined with no load.

In reference to FIG. 4, let us examine the operation of the voltage stabilizing equipment under the conditions of maximum input voltage E combined with no load; it is evident that in speaking of maximum or minimum voltages it is understood that relative percentage values in respect to the nominal voltage are intended with, for example, tolerances of 15% to 20% in respect to nominal voltage.

The diagrams shown in FIGS. 4 and 5 have been made using the same reference letters as used in FIG. 2 and arranging the various electrical components in phase and at the positions of their respective voltage drop vectors, in such a way that, for example, segment S–R indicates the amount and direction of the vector representing the voltage drop caused by the portion of linear inductance between S and R.

Under maximum voltage and no load conditions, the control circuit is made to act in such a way as to saturate inductance L*s*; so doing, the current which passes through it prevails over that of capacitor C and C–L*s* tank circuit acts to all effects and purposes as if it were a pure inductance. It will now be evident that since the circuit is made up solely of inductances in series with one another, the respective voltage drops will all be in phase with one another and the stabilized output voltage U will be equal to the vectorial difference (in this case also algebraic) *E*—*LR*.

In the opposite limiting case, when the input voltage E is minimum while a maximum allowable load is applied with also maximum allowable phase difference, the vector diagram will be of the type shown in FIG. 5; under these conditions inductance L*s* is desaturated by means of the control circuit and it will therefore absorb a small magnetizing current (acting as a no-load transformer); in this way the current drawn by the capacitor C will prevail and the tank circuit C–L*s* will behave as a pure capacitance.

With a greater lag in phase (which is the worst condition) the output voltage U will be composed of the vectorial sum of the input voltage E and the voltage drop across linear inductance LR; this voltage drop which will be in phase with the drop in inductance RS may be imagined as being the vectorial resultant of two voltage drops LT and TR respectively caused by the load current which flows through inductance LR and the capacitive current which flows over the entire length LS.

Changes in load Z*u*, in the absence of proper correction, also bring about changes in output voltage; suitable changes in the current in the C–L*s* circuit can correct the variations in output voltage caused by the load and maintain said voltage constant.

In few words, suitable changes in the value of inductance L*s* can be made to compensate for the effects of changes in the input voltage, of the supply voltage, and changes in load Z*u* so as to keep output voltage between points L and O constant.

Although several preferred forms of embodiment of the invention are described and represented herein, it remains understood that the scope of the invention includes all such variants which are readily accessible to an engineer or expert in the field not constituting an inventive contribution.

I claim:

1. An alternating voltage stabilizing circuit arrangement comprising, in combination, input means having a first and a second input terminal for applying a variable alternating input voltage; a linear inductance coil connected at one end thereof to said first input terminal and having a tap at a predetermined intermediate point of the length of said inductance coil, said tap constituting one output terminal for delivering a stabilized alternating output voltage; a tank circuit connected between said second input terminal and the other end of said linear inductance coil, that end of said tank circuit which is connected to said second input terminal constituting a second output terminal for delivering said stabilized alternating output voltage, said tank circuit comprising variable inductance means including at least two branches each comprising inductor means of the self-saturating type and a rectifier in series therewith, said two branches being connected in parallel with each other, the rectifier in one of said branches being arranged with its current-passing direction in opposition to that of the rectifier in the other branch, and capacitive circuit means connected in parallel with at least a part of said variable inductance means.

2. An arrangement as claimed in claim 1 wherein said capacitive circuit means include an inductance member and a capacitor in series with each other as a tunable circuit, said circuit being resonant at a frequency 3 times the frequency of said variable alternating input voltage so as to be capable of passing third harmonics thereof.

3. An arrangement as claimed in claim 1 wherein said capacitive circuit includes an inductance member and a capacitor in series with each other constituting a tunable circuit which is resonant at a multiple of the frequency of said alternating input voltage so as to form a by-pass filter for a harmonic of said alternating input voltage.

References Cited by the Examiner

UNITED STATES PATENTS

| | | | |
|---|---|---|---|
| 1,870,093 | 8/32 | Boyajian et al. | 323—61 X |
| 1,876,427 | 9/32 | Lennox | 323—61 X |
| 1,878,350 | 9/32 | Thompson | 323—61 X |
| 2,673,323 | 3/54 | Walker | 323—61 X |
| 2,933,649 | 4/60 | Bastian | 323—56 |
| 3,012,188 | 12/61 | Baude | 323—89 |
| 3,038,113 | 6/62 | Kusko | 333—76 |

LLOYD McCOLLUM, *Primary Examiner.*

MILTON O. HIRSHFIELD, *Examiner.*